United States Patent [19]

Sugiura et al.

[11] Patent Number: 4,469,063

[45] Date of Patent: Sep. 4, 1984

[54] INTAKE PORT STRUCTURE FOR INTERNAL COMBUSTION ENGINES

[75] Inventors: Yasuyuki Sugiura; Kazuo Nakama, both of Hamamatsu, Japan

[73] Assignee: Suzuki Jidosha Kogyo Kabushiki Kaisha, Shizuoka, Japan

[21] Appl. No.: 370,325

[22] Filed: Apr. 21, 1982

[30] Foreign Application Priority Data

May 7, 1981 [JP] Japan ............................... 56-67637
Mar. 1, 1982 [JP] Japan ............................... 57-30504

[51] Int. Cl.³ ............................................. F02B 31/02
[52] U.S. Cl. ................................. 123/308; 123/432; 123/188 M; 123/193 H
[58] Field of Search ............... 123/308, 432, 193 H, 123/193 CH, 306, 188 M

[56] References Cited

U.S. PATENT DOCUMENTS

| | | | |
|---|---|---|---|
| 3,045,655 | 7/1962 | Formia | 123/308 |
| 3,273,551 | 9/1966 | Julien et al. | 123/188 M |
| 4,159,011 | 6/1979 | Sperry | 123/193 H |
| 4,180,041 | 12/1979 | Miyazaki et al. | 123/188 M |
| 4,265,207 | 5/1981 | Hayashida | 123/432 |
| 4,271,801 | 6/1981 | Yamakawa et al. | 123/432 |
| 4,286,561 | 9/1981 | Tsutsumi | 123/432 |
| 4,359,026 | 11/1982 | Holthausen et al. | 123/306 |

FOREIGN PATENT DOCUMENTS 151721 11/1979 Japan ............................... 123/308

Primary Examiner—Ira S. Lazarus
Assistant Examiner—R. S. Bailey
Attorney, Agent, or Firm—Flynn, Thiel, Boutell & Tanis

[57] ABSTRACT

An intake port structure for an internal combustion engine having a primary intake passage defined in a cylinder head for supplying an air-fuel mixture into a combustion chamber in a full range of loads, and a secondary intake passage defined in the cylinder head for supplying an air-fuel mixture into the combustion chamber under relatively high load conditions. The primary intake passage has a first outlet port opening into the secondary intake passage immediately upstream of the valve face of an intake valve. The secondary intake passage has a second outlet port opening into the combustion chamber through the valve face. A wall projects sidewardly into the secondary intake passage adjacent to the second outlet port for deflecting an air-fuel mixture flowing from the secondary intake passage into the combustion chamber to form a swirl of air-fuel mixture in the combustion chamber. The air-fuel mixture flowing from the primary intake passage is guided along a side of the wall which faces upstream in the secondary intake passage, and is also guided by a groove extending from the first outlet port into the secondary intake passage. The side of the wall and the groove assist the air-fuel mixture flowing from the primary intake passage in forming a swirl of air-fuel mixture in the combustion chamber.

14 Claims, 7 Drawing Figures

4,469,063

INTAKE PORT STRUCTURE FOR INTERNAL COMBUSTION ENGINES

BACKGROUND OF THE INVENTION

1. Field of the Invention

The present invention relates to an intake port structure for an internal combustion engine having primary and secondary intake passages for each engine cylinder, and more particularly to such an intake port structure designed to produce swirls of air-fuel mixture in the engine cylinder for improving fuel combustion therein.

2. Prior Art

Internal combustion engines having primary and secondary intake passages for supplying air-fuel mixtures under low and high load conditions have widely been used to improve engine outputs. With such an internal combustion engine having a plurality of cylinders, and when the engine operates under low and medium loads using only the primary intake passage, an air-fuel mixture tends to flow back through secondary intake passages connected to closed intake valves into other secondary intake passages connected to opened intake valves, through which the air-fuel mixture is introduced into combustion chambers. Such an air-fuel mixture leakage through the secondary passages results in a reduced rate at which the air-fuel mixture is drawn from the primary intake passages into the cylinders and hence lessens swirls of air-fuel mixture formed therein.

To prevent the secondary air-fuel mixture leakage, there have heretofore been used check valves or restriction valves for blocking off a backward flow of air-fuel mixture. However, the check valve provides increased resistance to the flow of an air-fuel mixture through the secondary intake passages into the engine cylinders. The restriction valve renders the secondary intake passages quite complex in structure.

SUMMARY OF THE INVENTION

An intake port structure for an internal combustion engine comprises a cylinder head having a combustion chamber and an intake valve seat, an intake valve reciprocably mounted in the cylinder head and having a stem and a valve face engageable with the valve seat, a primary intake passae defined in the cylinder head for supplying an air-fuel mixture into the combustion chamber in a full range of load conditions, and a secondary intake passage defined in the cylinder head for supplying an air-fuel mixture into the combustion chamber under relatively high load conditions. The primary intake passage has a first outlet port opening into the secondary intake passage immediately upstream of the valve face. The secondary intake passage has a second outlet port opening into the combustion chamber through the valve face. A deflector wall projects into the secondary intake passage adjacent to the second outlet port for deflecting an air-fuel mixture flowing from the secondary intlake passage into the combustion chamber to form a swirl of air-fuel mixture in a direction in the combustion chamber. The wall has a side facing upstream in the secondary intake passage, and the first outlet port is oriented to direct an air-fuel mixture flowing from the primary intake passage along the side of the wall to form a swirl of air-fuel mixture along said direction in the combustion chamber. The secondary intake passage has a groove extending form the first outlet port along the side of the wall for guiding the air-fuel mixture flowing from the secondary intake passage into the combustion chamber. The groove has an end disposed remotely from the first outlet port and adjacent to the valve seat.

It is an object of the present invention to provide an intake port structure for internal combustion engines which includes means for directing air-fuel mixtures from primary and secondary intake passages to form swirls of air-fuel mixture in a combustion chamber.

Another object of the present invention is to provide an intake port structure for internal combustion engines which has means for enabling a secondary air-fuel mixture leakage to produce a swirling stream of air-fuel mixture in a combustion chamber.

Still another object of the present invention is to provide an intake port structure for internal combustion engines which is designed to improve fuel combustion in a combustion chamber.

The above and other objects, features and advantages of the present invention will become more apparent from the following description when taken in conjunction with the accompanying drawings in which certain preferred embodiments are shown by way of illustrative example.

DESCRIPTION OF THE PREFERRED EMBODIMENTS

Figure 1:
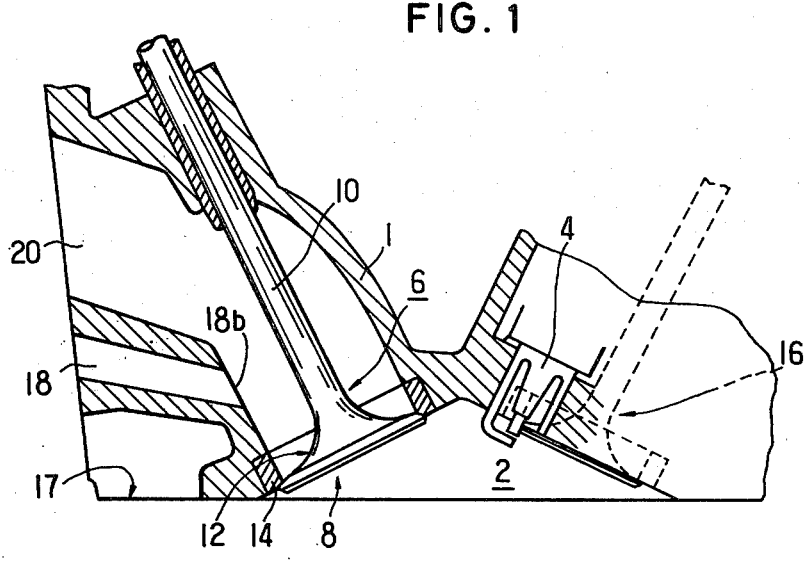
FIG. 1 is a fragmentary cross-sectional view of an intake port structure for internal combustion engines according to the present invention.
Figure 2:
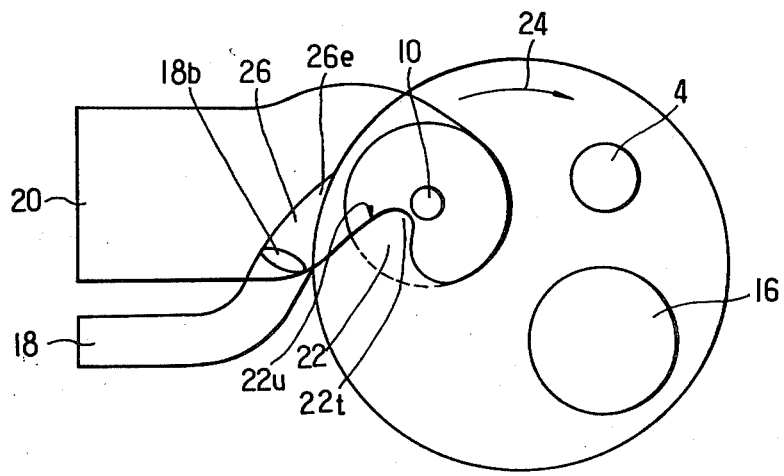
FIG. 2 is a schematic plan view of the intake port structure shown in FIG. 1.

As shown in FIGS. 1 and 2, an intake port structure comprises a cylinder head 1 having a combustion chamber 2, an intake valve 6 axially reciprocably mounted in the cylinder head 1 and having a stem 10 fixed to a head having thereon a valve face 12, a valve seat 14 with which the valve face 12 is engageable, a primary intake passage 18 defined in the cylinder head 1 for supplying an air-fuel mixture into the combustion chamber 2 via the intake valve 6 in a full range of engine loads, and a secondary intake passage 20 defined in the cylinder head 1 for supplying an air-fuel mixture via the intake valve 6 into the combustion chamber 2 under relatively high load conditions.

The primary intake passage 18 has a first outlet port 18b opening into the secondary intake passage 20 immediately upstream of the valve face 12. The secondary intake passage 20 has a second outlet port 8 opening into the combustion chamber 2 via the valve face 12. A spark plug 4 is supported on the cylinder head 1. An exhaust valve 16 is also reciprocably mounted in the cylinder head 1 and located in diametrically opposite relation to the intake valve 6, as best shown in FIG. 2.

Figure 3:
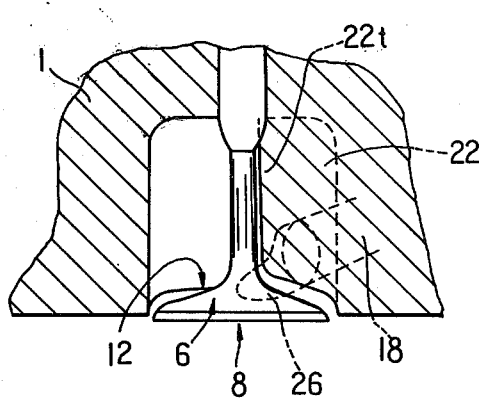
FIG. 3 is a fragmentary cross-sectional view of the intake port structure illustrated in FIG. 1.

As shown in FIGS. 2 and 3, a flow deflector wall 22 projects from the cylinder head 1 into the secondary intake passage 20 directly adjacent to the second outlet port 8. The wall 22 as it projects into the secondary intake passage 20 forms an end of the secondary intake passage 20 into the shape of a directional port or a helical port for deflecting the flow of an air-fuel mixture from the secondary intake passage 20 in a direction to produce a swirling current of air-fuel mixture which flows in the direction of the arrow 24 in the combustion chamber 2. The wall 22 has a distal end 22t disposed sufficiently close to the stem 10 of the intake valve 6. The air-fuel mixture flowing through the secondary intake passage 20 is given by the wall 22 a sustained tendency to swirl and, due to the closeness of the deflector wall 22 to the stem 10, the flow occurs substantially around one side of the valve stem and thence into the combustion cylinder 2. The swirling motion of air-fuel mixture within the combustion cylinder 2 is stronger than would otherwise be if no wall were provided.

The primary intake passage 18 is located close to and extends substantially parallel to a deck surface 17 of the cylinder head 1. The first outlet port 18b is orirented in tangential relation (see FIG. 2) to the combustion chamber 2, and angled downwardly at a small acute angle relative to the plane of the valve seat as shown in FIG. 1, such that the air-fuel mixture flowing from the primary intake passage 18 is directed along a side 22u of the wall 22 which faces upstream in the secondary intake passage 20 so as to form a swirling flow of air-fuel mixture which is also in the direction of the arrow 24 within the combustion chamber 2. With the primary intake passage 18 extending substantially parallel to the deck surface 17, the air-fuel mixture supplied from the primary intake passage 18 flows into the combustion chamber 2 in a direction substantially parallel to the deck surface 17.

Figure 4:
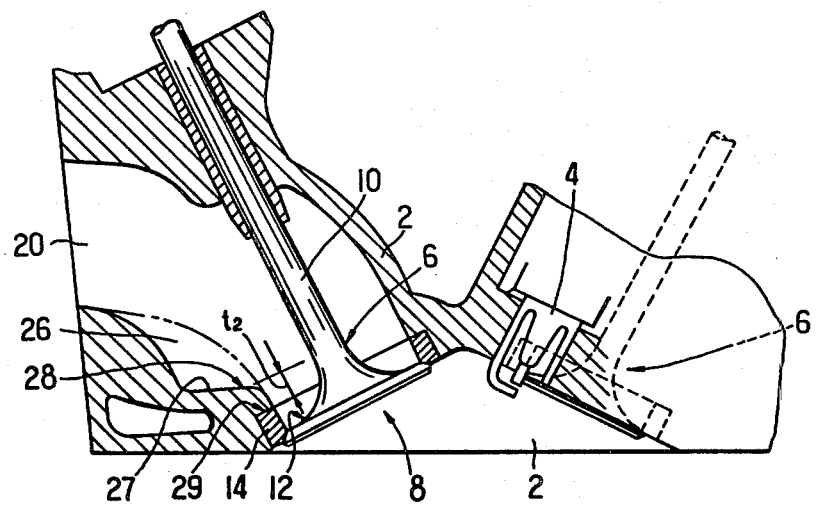
FIG. 4 is a view similar to FIG. 1, showing a different cross section of the intake port structure.

The secondary intake passage 20 has in its inner surface groove 26 extending from the first outlet port 18b along the side 22u of the wall 22, as shown in FIGS. 2 and 4. The groove 26 has its terminal end 26e disposed sufficiently close to the valve seat 14. The groove 26 with its end 26e adjacent to the valve seat 14 causes the air-fuel mixture fed from the primary intake passage 18 to be guided along the wall side 22u and hence to retain its tendency to form a swirling flow once the air-fuel mixture enters the combustion chamber 2, irrespectively of the flow of an air-fuel mixture from the secondary intake passage 20 which is apt to disturb and weaken the orientation of the air-fuel mixture coming out of the first outlet port 18b.

The groove 26 is substantially semicircular in cross section and directed in tangential relation to the combustion chamber 2. As shown in FIG. 4. the groove 26 has a bottom surface 27 including a distal end portion 28 which lies closely to an upper surface 29 of the valve seat 14, or within a predetermined distance $t_2$ from the upper surface 29 of the valve seat 14. The distance $t_2$ should preferably be 5 mm or less. With the groove 26 thus configured, the air-fuel mixture supplied from the primary intake passage 18 is allowed to flow substantially horizontally through the second outlet port 8 as surrounded by the valve seat 14 into the combustion chamber 2 without interference with the intake valve 6.

The intake port structure thus constructed will operate as follows: While the engine operates under low or medium loads, an air-fuel mixture flows only from the primary intake passage 18 into the combustion chamber 2, in which the air-fuel mixture is subjected to strong swirling motion, since the air-fuel mixture is caused by the wall 22 and groove 26 to enter tangentially the combustion chamber 2 past the valve stem 10 on one side thereof. At this time, an air-fuel mixture which leaks through the secondary intake passage 20 tends to flow into the combustion chamber 2 at a slow speed and with no directivity due to the secondary intake passage 20 being larger in diameter than the primary intake passage 18. Such an air-fuel mixture leakage is however guided by the projecting wall 22 to flow therealong tangentially into the combustion chamber 2 past the valve stem 10 on one side thereof, as does the air-fuel mixture delivered from the primary intake passage 18. The air-fuel mixture as thus supplied from the secondary intake passage 20 undergoes swirling motion along the direction of the arrow 24 in the combustion chamber 2.

When the engine operates under a high load condition, an additional air-fuel mixture delivered from the secondary intake passage 20 is also deflected by the wall 22 so as to flow tangentially into the combustion chamber 2, in which the air-fuel mixture makes strong swirling motion.

There has conventionally been a tendency for the air-fuel mixture from the secondary intake passage 20 to disturb the air-fuel mixture from the primary intake passage 18, whereupon the latter air-fuel mixture loses its directivity toward the combustion chamber 2. According to the present invention, the groove 26 extending along the side 22u of the wall 22 with the bottom surface 27 lying adjacent to the upper surface 29, guides the air-fuel mixture flowing from the primary intake passage 18 to enter the combustion chamber 2 without being interrupted by the air-fuel mixture supplied from the secondary intake passage 20.

Where it is sufficient for practical purposes only to give the air-fuel mixture from the secondary intake passage 20 a tendency to swirl in the combustion chamber 2, the groove 26 may be dispensed with and only the wall 22 may be provided.

Figure 5:
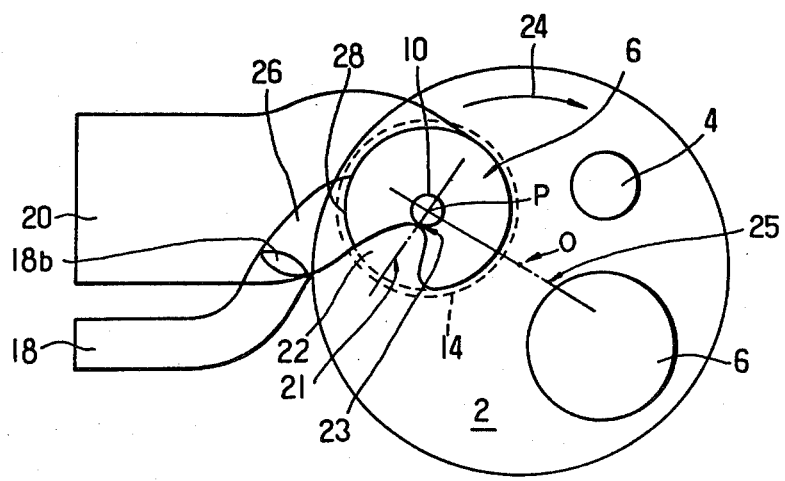
FIG. 5 is a schematic plan view of an intake port structure according to another embodiment.

According to another embodiment shown in FIG. 5, a deflector wall 22 which projects from the cylinder head into the secondary intake passage 20 has a distal end or rounded tip 23 located on a straight line 21 passing through the axis P of the valve stem 10 perpendicularly to another straight line 25 passing through the center O of the combustion chamber 2 and the axis P within a plane extending normal to the axis P. With the wall 22 thus contoured, the first outlet port 18b of the primary intake passage 18 has its longitudinal axis, in plan view, directed substantially parallel to the line 21.

The wall 22 with the distal end 23 thus located is effective for the formation of swirling currents of air-fuel mixture. Experiments indicated that if the distal end 23 were displaced upstream off the line 21, engine outputs would be lowered, and if the distal end 23 were displaced downstream off the line 21, the air-fuel mixture would undergo less swirling motion in the combustion chamber 2. Therefore, no improved fuel combustion would result from a differently shaped wall.

The distal end 23 of the wall 22 is located close to the valve stem 10 to prevent the deflected air-fuel mixture flow from being dampened due to interference with the valve stem 10, to block passage of the air-fuel mixture between the wall 22 and the valve stem 10, and to deflect and hence cause increased flow of air-fuel mixture tangentially into the combustion chamber 2.

Figure 6:
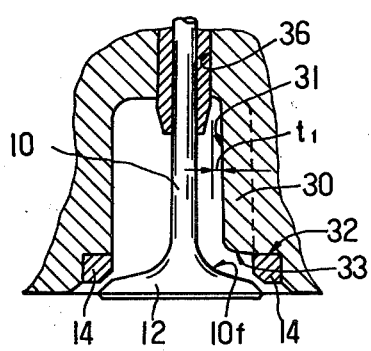
FIGS. 6 and 7 are fragmentary cross-sectional views of intake port structures according to other embodiments.

As shown in FIG. 6, a deflector wall 30 projecting from the cylinder head 2 may have a distal end 31 lying a predetermined distance $t_1$ laterally from an inner peripheral surface of a bore 36 for a valve guide in which the valve stem 10 is axially slidably fitted. The distance t₁ should preferably be 2 mm or less.

Figure 7:
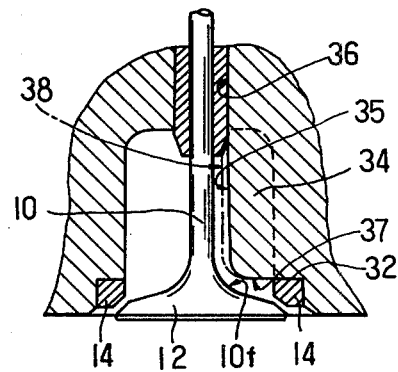

According to still another embodiment shown in FIG. 7, a deflector wall 34 has a distal end 35 lying flush with an inner peripheral surface of the bore 36. Alternatively, the wall 34 may have its distal end 38 displaced laterally toward the valve stem 10 a distance (preferably 2 mm or less) from the inner surface of the bore 36. As illustrated in FIGS. 6 and 7, the wall 30 or 34 has a lower surface 33 or 37 located as closely as possible to an upper surface 10f of the valve face 12 so that the lower surface 33 or 37 will lie substantially flush with the upper surface 10f of the valve face 12 when the latter is held against the valve seat 14.

It is preferable to bring the distal end of the projecting deflector wall as closely as possible to the valve stem 10. It has however been found through experiments that the distal end of the wall may be disposed in a range of 2 mm toward or away from the valve stem 10, laterally from the inner surface of the bore 36, for the purpose of avoiding complicated machining and yet achieving desired advantages. Where the distal end is displaced 2 mm or less toward the valve stem 10 laterally from the inner surface of the bore 36, the distal end may not be machined, but its casing surface may remain unfinished. The wall with such a distal end does not impair reciprocable movement of the intake valve, and serves as a good shield against passage of the flow of an air-fuel mixture between the deflector wall and the intake valve.

The advantages accruing from the intake port structures of the present invention are as follows:

(1) The deflector wall lying closely to the valve stem and face acts as a shield to prevent an air-fuel mixture from flowing between the deflector wall and the valve stem, and causes an air-fuel mixture to be deflected toward and past one side of the valve stem. The air-fuel mixture thus supplied forms a strong swirl in the combustion chamber. The directivity of the air-fuel mixture and the swirling motion thereof are not weakened by the valve stem.

(2) The deflector wall serves to give a swirling motion to an air-fuel mixture which leaks through the secondary intake passage while the engine operates under low and medium loads. Such a swirling air-fuel mixture delivered from the secondary intake passage assists in strengthening a swirling current of air-fuel mixture flowing from the primary intake passage. The air-fuel mixture as introduced in the combustion chamber is improved in property for speeding up fuel combustion, improving limitations on the leanness of an air-fuel mixture and EGR (Exhaust Gas Recirculation), purifying the exhaust gas, improving drivability, and achieving better fuel economy.

(3) While the engine operates under high loads, an air-fuel mixture supplied from the secondary intake passage is also deflected by the wall into a swirling flow. Thus, a strong swirl of air-fuel mixture can be produced without reducing the charging efficiency for thereby increasing engine outputs.

(4) The groove extending along the projecting wall in the secondary intake passage with the bottom surface of the groove being located closely to the upper surface of the valve seat, allows an air-fuel mixture from the primary intake passage to be guided tangentially into the combustion chamber without being disturbed by the flow of an air-fuel mixture from the secondary intake passage. Thus, the air-fuel mixture flowing from the primary intake passage can form a strong swirling current in the combustion chamber.

(5) Since the primary intake passage extends substantially horizontally parallel to the deck surface of the cylinder head, the swirling flow of air-fuel mixture delivered from the primary intake passage is also substantially parallel to the deck surface within the combustion chamber. Such a swirling flow is therefore resistant to dampening during compression stroke of the engine, remains unimpaired in the combustion chamber for improved fuel combustion.

(6) An air-fuel mixture fed from the primary intake passage is oriented by the groove along the projecting wall so as not to hit the valve seat and stem for smooth introduction into the combustion chamber and formation of stronger swirling currents of air-fuel mixture. The primary intake passage is therefore not dependent on the construction of the secondary intake passage. The secondary intake passage can be designed independently such that it extends more vertically (parallel to the axis of the engine cylinder) than horizontally. The charging efficiency that the secondary intake passage serves to improve is not lowered, while at the same time the air-fuel mixture flowing from the secondary intake passage can be formed by the projecting wall into a desired swirling flow in the combustion chamber.

Although certain preferred embodiments have been shown and described in detail, it should be understood that various changes and modifications may be made therein without departing from the scope of the appended claims.

What is claimed is:

1. An intake port structure for an internal combustion engine, comprising:
   a cylinder head having a combustion chamber and an intake valve seat;
   an intake valve reciprocably mounted in said cylinder head and having an elongated stem fixed to a valve head provided with a valve face engageable with said valve seat;
   a primary intake passage defined in said cylinder head for supplying an air-fuel mixture into said combustion chamber in a full range of load conditions;
   a secondary intake passage defined in said cylinder head for supplying an air-fuel mixture into said combustion chamber under relatively high load conditions;
   said primary intake passage having a first outlet port opening directly into said secondary intake passage directly above said valve seat, the flow from said first outlet port being directed approximately tangentially to said combustion chamber and angled downwardly at a rather small acute angle with respect to a plane defined by said valve seat;
   said secondary intake passage having a second outlet part opening directly into said combustion chamber through said valve seat;
   a deflector wall fixed to said cylinder head and protruding sidewardly into said secondary passage closely adjacent said second outlet port and having a distal end positioning closely adjacent to said valve stem so that the flow of air-fuel mixture is deflected sidewardly substantially around one side of said valve stem and thence into said combustion chamber to form a swirl of air-fuel mixture in said combustion chamber; and said secondary intake passage having a groove extending from said first outlet port along an upstream side of said deflector wall for guiding the air-fuel mixture flowing from said primary intake passage through said second outlet port into said combustion chamber.

2. An intake port structure according to claim 1, wherein said one side of said deflector wall is formed by a smoothly curved sidewall which faces upstream of said secondary intake passage and which terminates in a rounded tip which defines said distal end, and wherein said deflector wall has a lower surface which overlies and is positioned closely adjacent an upper surface of the head of the intake valve, said deflector wall creating a flow barrier which extends radially across one side of the secondary intake passage directly adjacent and upstream of the valve head so that substantially all of the flow of the air-fuel mixture occurs substantially around the other diametral side of the valve stem.

3. An intake port structure according to claim 2, wherein said groove has an end disposed remotely from said first outlet port and positioned directly adjacent the valve seat.

4. An intake port structure according to claim 3, wherein said secondary intake passage has an end passage portion which terminates directly in said second outlet port, said end passage portion projecting downwardly in substantially perpendicular communication with a plane defined by the second outlet port, said intake valve having the valve stem thereof projecting upwardly through the end passage portion and through a passage wall which is defined on said cylinder head and is spaced upwardly from and directed downwardly toward the second outlet port, and said first outlet port being formed in a sidewall of said cylinder head which defines said end passage portion and projects substantially perpendicularly away from the plane of said second outlet port, said first outlet port being formed in said last-mentioned sidewall closely adjacent and directly upwardly from the valve seat, said first outlet port being in communication with said secondary intake passage at a side thereof which is substantially diametrically opposite from a side thereof which is penetrated by the valve stem.

5. An intake port structure according to claim 2, wherein said secondary intake passage has an end passage portion which terminates directly in said second outlet port, said end passage portion projecting downwardly in substantially perpendicular communication with a plane defined by the second outlet port, said intake valve having the valve stem thereof projecting upwardly through the end passage portion and through a passage wall which is defined on said cylinder head and is spaced upwardly from and directed downwardly toward the second outlet port, and said first outlet port being formed in a sidewall of said cylinder head which defines said end passage portion and projects substantially perpendicularly away from the plane of said second outlet port, said first outlet port being formed in said last-mentioned sidewall closely adjacent and directly upwardly from the valve seat, said first outlet port being in communication with said secondary intake passage at a side thereof which is substantially diametrically opposite from a side thereof which is penetrated by the valve stem.

6. An intake port structure according to claim 1, wherein said distal end of said deflector wall is positioned on a first line which intersects the central axis of the valve stem and extends perpendicularly to a second line which intersects both the central axes of said valve stem and the central axis of said combustion chamber.

7. An intake port structure according to claim 1, wherein said cylinder head has a bore for a valve guide in which said stem of said intake valve is axially slidably fitted, said distal end of said deflector wall lying laterally within a predetermined distance from an inner peripheral surface of said bore.

8. An intake port structure according to claim 7, wherein said predetermined distance is 2 mm.

9. An intake port structure according to claim 1, wherein said groove has a bottom surface disposed adjacent to an upper surface of said valve seat.

10. An intake port structure according to claim 9, wherein said bottom surface is disposed within about 5 mm from an upper surface of said valve seat.

11. An intake port structure according to claim 1, wherein said deflector wall has a lower surface which lies over and within a predetermined distance from an upper surface of the valve head.

12. An intake port structure according to claim 11, wherein the lower surface of said deflector wall lies substantially flush with an upper surface of said valve seat.

13. An intake port structure according to claim 1, wherein said first outlet port is oriented tangentially to said combustion chamber.

14. An intake port structure according to claim 1, wherein said groove has an end disposed remotely from said first outlet port and adjacent to said valve seat.

* * * * *

UNITED STATES PATENT AND TRADEMARK OFFICE
CERTIFICATE OF CORRECTION

PATENT NO. : 4 469 063

DATED : September 4, 1984

INVENTOR(S) : Yasuyuki Sugiura et al

It is certified that error appears in the above-identified patent and that said Letters Patent is hereby corrected as shown below:

Column 6, line 63; change "positioning" to ---positioned---.

Signed and Sealed this

Twelfth Day of March 1985

[SEAL]

Attest:

DONALD J. QUIGG

Attesting Officer     Acting Commissioner of Patents and Trademarks